United States Patent
Abe

(10) Patent No.: US 6,812,262 B2
(45) Date of Patent: Nov. 2, 2004

(54) SILANE-CROSSLINKING EXPANDABLE POLYOLEFIN RESIN COMPOSITION AND CROSSLINKED FOAM

(75) Inventor: Shigehiko Abe, Yokkaichi (JP)

(73) Assignee: Tosoh Corporation, Yamaguchi (JP)

( * ) Notice: Subject to any disclaimer, the term of this patent is extended or adjusted under 35 U.S.C. 154(b) by 78 days.

(21) Appl. No.: 10/412,272

(22) Filed: Apr. 14, 2003

(65) Prior Publication Data

US 2003/0199597 A1 Oct. 23, 2003

(30) Foreign Application Priority Data

Apr. 18, 2002 (JP) .................................. P. 2002-116001
Jan. 30, 2003 (JP) .................................. P. 2003-021793

(51) Int. Cl.$^7$ .................................................. C08J 9/10
(52) U.S. Cl. ........................... 521/89; 521/91; 521/134
(58) Field of Search ........................... 521/89, 91, 134, 521/81

(56) References Cited

U.S. PATENT DOCUMENTS

| | | |
|---|---|---|
| 3,646,155 A | 2/1972 | Scott |
| 4,554,293 A | 11/1985 | Park |
| 4,591,606 A * | 5/1986 | Bergstrom |
| 4,870,111 A | 9/1989 | Donuiff et al. |
| 5,589,519 A | 12/1996 | Knaus |
| 5,844,009 A | 12/1998 | Hurley et al. |
| 5,883,145 A | 3/1999 | Hurley et al. |
| 5,929,129 A * | 7/1999 | Feichtinger |
| 6,103,775 A | 8/2000 | Bambara et al. |
| 6,350,512 B1 | 2/2002 | Hurley et al. |
| 2001/0027221 A1 | 10/2001 | Bambara et al. |

FOREIGN PATENT DOCUMENTS

| | | |
|---|---|---|
| JP | 73001711 B | 1/1973 |
| JP | 57049109 A | 3/1982 |
| JP | 57208006 A | 12/1982 |
| JP | 60254520 A | 12/1985 |
| JP | 62106947 A | 5/1987 |
| JP | 04331241 A | 11/1992 |

\* cited by examiner

*Primary Examiner*—Morton Foelak
(74) *Attorney, Agent, or Firm*—Sughrue Mion, PLLC

(57) ABSTRACT

A silane-crosslinking expandable polyolefin resin composition that is flowable before foaming and composition, does not cause degassing even when foaming is carried out immediately after heat molding without the conventional crosslinking operation, and gives a crosslinked foam having superior heat resistance (heat deformation properties) after the foaming. The silane-crosslinking expandable polyolefin resin composition includes 100 parts by weight of a mixture of 5–90% by weight of a silane-grafted polyethylene resin obtained by melt mixing 100 parts by weight of LLDPE having a molecular weight distribution of 5 or less and a density of 0.87–0.945 g/cm$^3$, 0.1–5 parts by weight of a vinyl-functional silane compound and 0.01–0.5 parts by weight of a free radical generator, and 95–10% by weight of a polyolefin resin; and 2–20 parts by weight of a specified organic blowing gas.

4 Claims, No Drawings

SILANE-CROSSLINKING EXPANDABLE POLYOLEFIN RESIN COMPOSITION AND CROSSLINKED FOAM

FIELD OF THE INVENTION

The present invention relates to a silane-crosslinking expandable polyolefin resin composition comprising a silane-grafted polyethylene resin obtained by melt mixing a linear low-density polyethylene, a vinyl-functional silane and a free radical generator, a polyolefin resin and an organic blowing agent, and to a crosslinked foam obtained by heating and foaming the composition.

DESCRIPTION OF THE RELATED ART

Hitherto, various processes of producing a crosslinked foam using a polyolefin resin have been known. Chemical crosslinking, electron beam-irradiation crosslinking, moisture crosslinking (followed by condensation of silanols to siloxanes), and the like are widely well known as the method of crosslinking polyethylene. Of those methods, the moisture crosslinking does not require a large-scale crosslinking apparatus as compared with the chemical crosslinking and electron beam-irradiation crosslinking. Further, in the moisture crosslinking, a degree of crosslinking is determined according to the grafting amount of silane. Accordingly, the moisture crosslinking has an advantage that it is easy to control the crosslinking, as compared with the chemical crosslinking and electron beam-irradiation crosslinking. A method in which polyethylene is allowed to react and graft with a vinyl-functional silane in the presence of a free radical generator to undergo silane grafting is known as the method of preparation of silane-grafted polyethylene to be used for the moisture crosslinking, and a so-called silane crosslinking method in which the silane grafted polyethylene is brought into contact with moisture in the presence of a suitable condensation catalyst to undergo crosslinking is generally known (see, for example, JP-B-48-1711 and JP-A-57-49109).

However, although the moisture crosslinking is not expense in the apparatus cost as compared with other crosslinking methods, it involved a problem such that a long period of time and a high cost are required for the crosslinking treatment. For example, since in molded materials obtained from a moisture-crosslinkable resin composition, the progress of a crosslinking reaction is extremely slow at a temperature under the softening point of the composition, it is necessary to promote the crosslinking at a temperature above the softening point in high-humidity tank using hot water of about 80° C. or steam. In order to completely proceed crosslinking reaction even by such a method, it takes about 24–36 hours, and hence, investment expenses of crosslinking treatment facilities are enormous. For this reason, even if the apparatus cost is not expensive, huge expenses for the crosslinking treatment are required.

In order to solve such problems, various attempts have hitherto been made in which a moisture-crosslinkable resin is subjected to extrusion molding, pipe molding, wire coating, or foaming, thereby shortening the crosslinking treatment time of the resulting product. For example, the following methods are proposed: a method in which a catalyst or an assistant is added to a silane-grafted polymer to promote the crosslinking (see, for example, JP-A-57-208006 and JP-A-62-106947); a method in which the contact with moisture during the crosslinking is enhanced to shorten the crosslinking time (see, for example, JP-A-60-254520); and a method in which the crosslinking treatment is carried out in a ultrasonic atmosphere to proceed with diffusion of water into the moisture-crosslinked resin, thereby shortening the crosslinking treatment time (see, for example, JP-A-4-331241).

However, although all of the above proposed methods can shorten the crosslinking treatment time by the hot water or steam treatment to some extent, in the case where the thickness of a molded material is large or in the case of a foam, a very long period of time was still required in order that the crosslinking uniformly proceeds into the central portion. In addition, in the foaming, since the crosslinking reaction is usually carried out prior to the foaming, the degree of crosslinking scatters between the vicinity of the surface and the central portion of the product leads to a cause of scatter in the cell size. For this reason, chemical crosslinking or electron beam-irradiation crosslinking is mainly employed for the crosslinking foaming using polyethylene.

SUMMARY OF THE INVENTION

The invention has been made to overcome the above-described problems in the prior art.

Accordingly, one object of the invention is to provide a silane-crosslinking expandable polyolefin resin composition that is flowable prior to the foaming and forms a crosslinked foam having superior heat resistance (heat deformation properties) after the foaming. In particular, the invention provides a silane-crosslinking expandable polyolefin resin composition that does not cause degassing even when foaming is carried out immediately after heat molding, and gives a crosslinked foam without need of the conventional crosslinking operation.

As a result of extensive and intensive investigations to overcome the above-described problems, it has been found that a silane-crosslinking expandable polyolefin composition comprising a mixture of a specified silane-grafted polyethylene resin and a polyolefin resin, and a specified organic blowing agent is flowable prior to foaming and forms a foam having superior heat resistance after the foaming. The invention has been completed based on this finding.

The invention provides a silane-crosslinking expandable polyolefin resin composition comprising:

100 parts by weight of a mixture comprising

5–90% by weight of a silane-grafted polyethylene resin obtained by melt mixing i) 100 parts by weight of a linear low-density polyethylene having a molecular weight distribution (Mw/Mn), as determined in terms of a converted value of linear polyethylene using 1,2,4-trichlorobenzene as a solvent by a gel permeation chromatograph, of 5 or less and a density, as determined according to JIS K7676, of 0.87–0.945 g/cm³, ii) 0.1–5 parts by weight of a vinyl-functional silane compound represented by the following formula:

$$RR'SiY_2$$

wherein R represents a monovalent olefinic unsaturated hydrocarbon group, Y represents a hydrolyzable organic group, and R' represents a monovalent hydrocarbon group other than aliphatic unsaturated hydrocarbons or is identical with Y, and iii) 0.01–0.5 parts by weight of a free radical generator, and 95–10% by weight of a polyolefin resin, and 2–20 parts by weight of an organic blowing agent capable of generating an acidic substance and/or water as a decomposition product during heat decomposition.

DETAILED DESCRIPTION OF THE INVENTION

The silane-crosslinking expandable polyolefin resin composition of the invention comprises 100 parts by weight of a mixture comprising 5–90% by weight of a silane-grafted polyethylene resin and 95–10% by weight of a polyolefin resin, and 2–20 pats by weight of an organic blowing agent capable of generating an acidic substance and/or water as a decomposition product upon heat decomposition.

The silane-grafted polyethylene resin used in the invention is obtained by melt mixing i) 100 parts by weight of a linear low-density polyethylene having a molecular weight distribution (Mw/Mn), as determined in terms of a converted value of linear polyethylene using 1,2,4-trichlorobenzene as a solvent by a gel permeation chromatograph, of 5 or less and a density of 0.87–0.945 g/cm³, ii) 0.1–5 parts by weight of a vinyl-functional silane compound represented by the following formula:

RR'SiY$_2$ wherein R represents a monovalent olefinic unsaturated hydrocarbon group, Y represents a hydrolyzable organic group, and R' represents a monovalent hydrocarbon group other than aliphatic unsaturated hydrocarbons or is identical with Y, and iii) 0.01–0.5 parts by weight of a free radical generator.

The linear low-density polyethylene used herein can be any materials falling within the scope of a linear low-density polyethylene having a molecular weight distribution (Mw/Mn), as determined by a gel permeation chromatograph, of 5 or less and a density of from 0.87–0.945 g/cm³. Such a linear low-density polyethylene can be obtained by, for example, various polymerization methods such as gas phase method solution method, and suspension polymerization method under medium- or low-pressure or high-pressure conditions, using ethylene and an α-olefin in the presence of various catalysts such as Ziegler-based catalysts, metallocene-based catalysts, vanadium-based catalysts, and chromium-based catalysts. Especially, a metallocene-based catalyst or a vanadium-based catalyst as the catalyst is preferable for the reason that a linear low-density polyethylene having a molecular weight distribution of 5 or less is efficiently obtained. Examples of the α-olefin include α-olefins having 3–12 carbon atoms such as propylene, butene-1, pentene-1, octene-1, 4-methylpentene-1, 4-methylhexene-1, 4,4-di-methylpentene-1, nonene-1, decene-1, undecene-1, and dodecene-1.

In the case where the molecular weight distribution of the linear low-density polyethylene exceeds 5, the introduction of a silane graft group during the production of the silane-grafted polyethylene resin becomes non-uniform so that when forming into a crosslinked foam, the product is liable to cause appearance failure. Further, in the case where the density of the linear low-density polyethylene exceeds 0.945 g/cm³, the melting point of the linear low-density polyethylene becomes high. Accordingly, a polyethylene resin is obtained, but when the blowing agent is kneaded, it is necessary to increase the kneading temperature during the preparation. As a result, the crosslinking reaction proceeds, making it impossible to obtain the silane-crosslinking expandable polyolefin resin composition of the invention.

The molecular weight distribution in the invention is obtained in terms of a converted value of linear polyethylene using 1,2,4-trichlorobenzene as a solvent by a gel permeation chromatograph, unless otherwise mentioned. Further, the density is measured according to JIS K7676.

The vinyl-functional silane compound used is a compound that is grafted on the linear low-density polyethylene such that it becomes a crosslinking point among the linear low-density polyethylene molecular chains. Such vinyl-functional silane compound are compounds represented by the following formula:

RR'SiY$_2$ wherein R represents a monovalent olefinic unsaturated hydrocarbon group, Y represents a hydrolyzable organic group, and R' represents a monovalent hydrocarbon group other than aliphatic unsaturated hydrocarbons or is identical with Y.

Of those compounds, vinyl-functional silane compounds wherein R' and Y are the same, which are represented by the general formula: RSiY$_3$, are preferably used. Examples of such compounds include vinyl methoxysilane, vinyl triethoxysilane, vinyl tributoxysilane, allyl trimethoxysilane, and allyl triethoxysilane.

The amount of the vinyl-functional silane compound added is 0.1–5 parts by weight, and preferably 0.7–3 parts by weight, per 100 parts by weight of the linear low-density polyethylene. If the addition amount of the vinyl-functional silane compound is less than 0.1 parts by weight, a silane-grafted polyethylene resin having satisfactory crosslinking properties cannot be obtained. On the other hand, if the addition amount of the vinyl-functional silane compound exceeds 5 parts by weight, when the resulting crosslinking expandable polyolefin resin composition is subjected to foaming, molding failure occurs, which is not economical.

The free radical generator used functions as an initiator of the silane graft reaction, and various organic peroxides or peresters having a strong polymerization initiation action can be used. Examples of the free radical generator include dicumyl peroxide, α,α'-bis(t-butyl peroxydiisopropyl) benzene, di-t-butyl peroxide, t-butylcumyl peroxide, dibenzoyl peroxide, 2,5-dimethyl-2,5-bis(t-butyl peroxy)hexane, t-butyl peroxypivalate, and t-butyl peroxy-2-ethylhexanoate.

The amount of the free radical generator added is 0.01–0.5 parts by weight, and preferably 0.05–0.2 parts by weight, per 100 parts by weight of the linear low-density polyethylene. If the addition amount of the free radical generator is less than 0.01 parts by weight, a silane-grafted polyethylene resin having satisfactory silane grafting properties cannot be obtained. On the other hand, if the addition amount of the free radical generator exceeds 0.5 parts by weight, the molded surface of the resulting crosslinked foam becomes poor.

The preparation method of the silane-grafted polyethylene resin is not particularly limited, and the conventional extruding methods can be used. For example, the silane-grafted polyethylene resin can be obtained by a method of compounding 0.1–5 parts by weight of the vinyl-functional silane compound and 0.01–0.5 parts by weight of the free radical generator with 100 parts by weight of the linear low-density polyethylene, mixing the resulting blend by a mixer such as a Henschel mixer, a V-blender, a ribbon blender or a tumbler mixer, and compounding the mixture with an extruder such as a single screw extruder, a twin-screw extruder, a kneader or a Banbury mixer.

The silane-crosslinking expandable polyolefin resin composition comprises 100 parts by weight of a mixture comprising 5–90% by weight, preferably 20–40% by weight, of the above silane-grafted polyethylene resin and 95–10% by weight, preferably 80–60% by weight, of a polyolefin resin, and 2–20 parts by weight, preferably 5–15 parts by weight, of an organic blowing agent.

The polyolefin resin used can be any material falling within the scope of a general polyolefin resin. Examples of the polyolefin resin include homopolymers of an α-olefin having from about 2–8 carbon atoms (such as ethylene, propylene, and butene-1); and copolymers of such an α-olefin with other α-olefin having about 2–20 carbon atoms (such as ethylene, propylene, butene-1, 3-methylbentene-1, pentene-1, 4-methylpentene-1, hexene-1, octene-1, and decene-1), or with vinyl acetate, (meth)acrylic acid or a (meth)acrylic acid ester. Specific examples of the polyolefin include (branched or linear) ethylene homopolymers such as a low-density polyethylene, a medium-density polyethylene, and a high-density polyethylene; ethylene-based resins such as an ethylene-propylene copolymer, an ethylene-butene-1 copolymer, an ethylene-4-methylpentene-1 copolymer, an ethylene-hexene-1 copolymer, an ethylene-octene-1 copolymer, an ethylene-vinyl acetate copolymer, an ethylene-(meth)acrylic acid copolymer, and an ethylene-ethyl (meth)acrylate copolymer; propylene homopolymers; propylene-based resins such as a propylene-ethylene copolymer and a propylene-ethylene-butene-1 copolymer; butene-1 homopolymers; and butene-1-based resins such as a butene-1-ethylene copolymer and a butene-1-propylene copolymer.

The mixture comprising the silane-grafted polyethylene resin and the polyolefin resin comprises 5–90% by weight of the silane-grafted polyethylene resin and 95–10% by weight of the polyolefin resin. If the amount of the silane-grafted polyethylene resin is less than 5% by weight, when the resulting silane-crosslinking expandable polyolefin resin composition is subjected to foaming, degassing occurs so that it is impossible to obtain a crosslinked foam. On the other hand, if the amount of the silane-grafted polyethylene resin exceeds 95% by weight, when the resulting silane-crosslinking expandable polyolefin resin composition is subjected to foaming, the degree of crosslinking is too high so that only a crosslinked foam having a low expansion ratio is obtained.

The organic blowing agent used in the invention decomposes during melt processing of the silane-crosslinking expandable polyolefin resin to generate a gas, thereby foaming, and also generates an acidic compound and/or water as a decomposition product during decomposition at foaming to promote moisture crosslinking by a silane graft group. Examples of the organic blowing agent include sulfonyl hydrazide compounds such as benzenesulfonyl hydrazide, benzene-1,3-sulfonyl hydrazide, diphenylsulfone-3,3'-disulfonyl hydrazide, diphenyl oxide-4,4'-disulfonyl hydrazide, 4,4'-oxybis(benzenesulfonyl hydrazide), and p-toluenesulfonyl hydrazide. Those compounds can be used alone or as a mixture with general organic or inorganic chemical blowing agents. Examples of the organic or inorganic chemical blowing agents include azo compounds such as azodicarbonamide, 2,2'-azobisisobutyronitrile, azohexa-hydrobenzonitrile, and diazoaminobenzene; nitroso compounds such as N,N'-dinitrosopentamethylenetetramine and N,N'-dinitroso-N,N'-dimethylphthalamide; diazide compounds such as terephthaldiazide and p-t-butylbenzazide; and inorganic compounds such as sodium bicarbnate, ammonium bicarbonate, and ammonium carbonate. At least one of those blowing agents is used. Of those, 4,4'-oxybis (benzenesulfonyl hydrazide) or a mixture of 4,4'-oxybis (benzenesulfonyl hydrazide) and azodicarbonamide is preferably used as the organic blowing agent.

The organic blowing agent that generates an acidic compound and/or water as a decomposition product during decomposition is used in an amount of 2–20 parts by weight per 100 parts by weight of the mixture comprising 5–90% by weight of the silane-grafted polyethylene resin and 95–10% by weight of the polyolefinic resin. If the addition amount of the organic blowing agent is less than 2 parts by weight, the expansion properties are inferior when the resulting silane-crosslinking expandable polyolefin resin composition is subjected to foaming, and the cushioning properties and feeling deteriorate. On the other hand, if the addition amount of the organic blowing agent exceeds 20 parts by weight, not only the cost increases, but also coloration occurs during the foaming.

An expansion promoter or an expansion assistant can also be used for the purpose of decreasing the decomposition temperature of the organic blowing agent. Examples of the expansion promoter or expansion assistant include inorganic salts such as zinc flower, zinc nitrate, zinc phthalate, zinc carbonate, phosphorous trichloric acid salts, and tribasic lead sulfate; metallic soaps such as zinc fatty acid soaps, lead fatty acid soaps, and cadmium fatty acid soaps; acids such as boric acid, oxalic acid, succinic acid, and adipic acid; urea; ethanolamine; glucose; and glycerin.

On the other hand, an expansion inhibitor can be used for the purpose of increasing the decomposition temperature of the organic blowing agent. Examples of the expansion inhibitor include organic acids such as maleic acid, fumaric acid, phthalic acid, maleic anhydride, and phthalic anhydride; halogenated organic acids such as stearoyl chloride and phthaloyl chloride; polyhydric alcohols such as hydroquinone; fatty acid amines; fatty acid amides; organic sulfur-containing compounds such as oximes and isocyanates; phosphoric acid salts such as phosphorous acid chloride; tin compounds such as dibutyltin maleate, tin chloride, and tin sulfate; and hexachloropentadiene.

If desired and necessary, conventional additives such as antioxidants, neutralizing agent, UV absorbers, antistatics, pigments, dispersants, thickeners, metal degradation inhibitors, fungicides, fluidity regulators, other inorganic fillers, and other synthetic resins may be contained as other additives.

The preparation method of the silane-crosslinking expandable polyolefin resin composition of the invention is not particularly limited, and the conventional extruding methods can be used. For example, the silane-crosslinking expandable polyolefin resin composition of the invention can be obtained by a method of compounding 2–20 parts by weight of the organic blowing agent that generates an acidic compound and/or water as a decomposition product during decomposition with 100 parts by weight of the mixture comprising 5–90% by weight of the silane-grafted polyethylene resin and 95–10% by weight of the polyolefin resin, mixing those with a mixer such as a Henschel mixer, a V-blender, a ribbon blender or a tumbler mixer, and compounding the mixture with an extruder such as a single screw extruder, a twin-screw extruder, a kneader or a Banbury mixer.

The silane-crosslinking expandable polyolefin resin composition has a gel fraction after melt kneading of 1% by weight or less, preferably 0.5% by weight of lower, and more preferably 0% by weight, for the reason that when the resulting silane-crosslinking expandable polyolefin resin composition is subjected to foaming, the processability is particularly superior.

The crosslinking expandable polyolefin resin composition is extremely superior in heat deformation characteristic and can be used for various applications as a crosslinked foam by the general foaming method. When a post-crosslinking treatment step such as steam treatment or hot water treatment is carried out after extrusion, the heat resistance can further be improved, but this step may be omitted. For this reason, the crosslinking expandable polyolefin resin composition is particularly suitable for the production of a crosslinked foam requiring heat resistance, and after the foaming, the composition can be formed into a crosslinked foam without performing the moisture crosslinking step. Further, the foam after the foaming has a gel fraction of preferably 10% by weight or more, more preferably 15–50% by weight, from the standpoint of obtaining a crosslinked foam having uniform cell structure.

Unless otherwise mentioned, the gel fraction was measured by the following manner. The silane-crosslinking expandable polyolefin resin composition obtained or a crosslinked foam obtained is immersed in xylene at 120° C. for 24 hours, and a value (percentage) obtained by dividing the resulting residual weight by the weight of the foam before immersion is defined as the gel fraction.

The invention will be described in more detail with reference to the following Examples, but should be understood that the invention is not construed as being limited thereto. The polyolefin resins used in the following Examples and Comparative Examples are shown below.

SYNTHESIS EXAMPLE 1

Preparation of Silane-Grafted Polyethylene Resin:

A linear low-density polyethylene (a trade name: Nipolon-L M55, manufactured by Tosoh Corporation, melt flow rate as measured at 190° C. with a load of 2,160 g: 8 g/10 min., density: 0.920 g/cm$^3$, molecular weight distribution: 3.2) was powdered by mechanical pulverization. 2 parts by weight of vinyl triethoxysilane (a trade name: SZ6300, manufactured by Dow Corning Toray Silicone Co., Ltd.) as a vinyl-functional silane compound and 0.03 parts by weight of di-tert-butyl diisopropylbenzene (a trade name: Perbutyl-P, manufactured by NOF Corporation) as a free radical generator were compounded with 100 parts by weight of the powder, and the resulting blend was uniformly mixed by a Henschel mixer. The mixture was melt extruded by a 50-mm diameter single screw extruder maintained at 220° C. to obtain a pelletized silane-grafted polyethylene resin.

Polyolefin Resin

High-pressure low-density polyethylene (hereinafter referred to as "LDPE"): Ethylene homopolymer obtained by high-pressure radical polymerization (a trade name: Petrothene 190, manufactured by Tosoh Corporation, melt flow rate as measured at 190° C. with a load of 2,160 g: 4.0 g/10 min., density: 0.921 g/cm$^3$).

Linear low-density polyethylene (hereinafter referred to as "LLDPE"): Copolymer of ethylene and 1-hexene obtained by high-pressure polymerization using a Ziegler catalyst (a trade name: Lumitac 43-1, manufactured by Tosoh Corporation, melt flow rate as measured at 190° C. with a load of 2,160 g: 8.0 g/10 min., density: 0.905 g/cm$^3$).

Organic Blowing Agent 4,4'-Oxybis(benzenesulfonyl hydrazide) (a trade name: Neocellborn-N-5000, manufactured by Eiwa Chemical Ind. Co., Ltd.) (hereinafter referred to as "OBSH").

Azodicarbonamide (a trade name: Vinyfor-SE-30, manufactured by Eiwa Chemical Ind. Co., Ltd.) (hereinafter referred to as "ADCA").

The measurement methods in the Examples are described below.

Measurement of Molecular Weight Distribution:

The molecular weight distribution was measured in terms of a converted value of linear polyethylene using 1,2,4-trichlorobenzene as a solvent by a gel permeation chromatograph.

Measurement of Density:

The density was measured according to JIS K7676.

Measurement of Expansion Ratio:

The expansion ratio was determined by measuring a volume of an unexpanded molded material and a volume of an expanded molded material at 20° C. according to JIS K7197.

Evaluation of Expansion State:

A crosslinked expanded molded material thus obtained was visually evaluated.

EXAMPLE 1

10 parts by weight of OBSH as an organic blowing agent was compounded with 100 parts by weight of a mixture of 20% by weight of the silane-grafted polyethylene resin obtained in Synthesis Example 1 and 80% by weight of LDPE, and the blend was kneaded for 5 minutes using a mixing roll (8-inch test roll, manufactured by Kansai Roll Co., Ltd.) maintained at 130° C. to obtain a silane-crosslinking expandable polyolefin resin composition. The thus-obtained silane-crosslinking expandable polyolefin resin composition had a gel fraction of 0% by weight.

The silane-crosslinking expandable polyolefin resin composition was formed into a sheet having a thickness of 1 mm by a compression molding machine maintained at 140° C. The sheet was allowed to stand in a gear oven maintained at a temperature of 180° C. to decompose the organic blowing agent for conducting foaming. Thus, a crosslinked foam was obtained. The gel fraction of each of the resulting silane-crosslinking expandable polyolefin resin composition and crosslinked foam and the expansion ratio and state of cells of the resulting crosslinked material are shown in the Table below.

EXAMPLE 2

10 parts by weight of OBSH as an organic blowing agent was compounded with 100 parts by weight of a mixture of 20% by weight of the silane-grafted polyethylene resin obtained in Synthesis Example 1 and 80% by weight of LLDPE, and the blend was kneaded for 5 minutes using a mixing roll (8-inch test roll, manufactured by Kansai Roll Co., Ltd.) maintained at 130° C. to obtain a silane-crosslinking expandable polyolefin resin composition. The thus-obtained silane-crosslinking expandable polyolefin resin composition had a gel fraction of 0% by weight.

The silane-crosslinking expandable polyolefin resin composition was formed into a sheet having a thickness of 1 mm by a compression molding machine maintained at 140° C. The sheet was allowed to stand in a gear oven maintained at a temperature of 180° C. to decompose the organic blowing agent for conducting foaming. Thus, a crosslinked foam was obtained. The gel fraction of the resulting expandable polyolefin resin composition, the gel fraction of the foam, the expansion ratio and state of cell structure of the foam are shown in the Table below.

EXAMPLE 3

10 parts by weight of OBSH as an organic blowing agent was compounded with 100 parts by weight of a mixture of 50% by weight of the silane-grafted polyethylene resin obtained in Synthesis Example 1 and 50% by weight of LLDPE, and the blend was kneaded for 5 minutes using a mixing roll (8-inch test roll, manufactured by Kansai Roll Co., Ltd.) maintained at 130° C. to obtain a silane-crosslinking expandable polyolefin resin composition. The thus-obtained silane-crosslinking expandable polyolefin resin composition had a gel fraction of 0% by weight.

The silane-crosslinking expandable polyolefin resin composition was formed into a sheet having a thickness of 1 mm by a compression molding machine maintained at 140° C. The sheet was allowed to stand in a gear oven maintained at a temperature of 180° C. to decompose the organic blowing agent for conducting foaming. Thus, a crosslinked foam was obtained. The gel fraction of the resulting expandable polyolefin resin composition, the gel fraction of the foam, the expansion ratio and state of cell structure of the foam are shown in the Table below.

EXAMPLE 4

5 parts by weight of OBSH and 5 parts by weight of ADCA as organic blowing agents were compounded with 100 parts by weight of a mixture of 50% by weight of the silane-grafted polyethylene resin obtained in Synthesis Example 1 and 50% by weight of LLDPE, and kneaded for 5 minutes using a mixing roll (8-inch test roll, manufactured by Kansai Roll Co., Ltd.) maintained at 130° C. to obtain a silane-crosslinking expandable polyolefin resin composition. The thus-obtained silane-crosslinking expandable polyolefin resin composition had a gel fraction of 0% by weight.

The silane-crosslinking expandable polyolefin resin composition was formed into a sheet having a thickness of 1 mm by a compression molding machine maintained at 140° C. The sheet was allowed to stand in a gear oven maintained at a temperature of 180° C. to decompose the organic blowing agents for conducting foaming. Thus, a crosslinked foam was obtained. The gel fraction of the resulting expandable polyolefin resin composition, the gel fraction of the foam, the expansion ratio and state of cell structure of the foam are shown in the Table below.

EXAMPLE 5

10 parts by weight of OBSH and 5 parts by weight of ADCA as organic blowing agents were compounded with 100 parts by weight of a mixture of 20% by weight of the silane-grafted polyethylene resin obtained in Synthesis Example 1 and 80% by weight of LLDPE, and the blend was kneaded for 5 minutes using a mixing roll (8-inch test roll, manufactured by Kansai Roll Co., Ltd.) maintained at 130° C. to obtain a silane-crosslinking expandable polyolefin resin composition. The thus-obtained silane-crosslinking expandable polyolefin resin composition had a gel fraction of 0% by weight.

The silane-crosslinking expandable polyolefin resin composition was formed into a sheet having a thickness of 1 mm by a compression molding machine maintained at 140° C. The sheet was allowed to stand in a gear oven maintained at a temperature of 180° C. to decompose the organic blowing agents for conducting foaming. Thus, a crosslinked foam was obtained. The gel fraction of the resulting expandable polyolefin resin composition, the gel fraction of the foam, the expansion ratio and state of cell structure of the foam are shown in the Table below.

COMPARATIVE EXAMPLE 1

10 parts by weight of OBSH as an organic blowing agent was compounded with 100 parts by weight of LPDE, and the blend was kneaded for 5 minutes using a mixing roll (8-inch test roll, manufactured by Kansai Roll Co., Ltd.) maintained at 130° C. to obtain an expandable polyolefin resin composition.

The thus-obtained expandable polyolefin resin composition was formed into a sheet having a thickness of 1 mm by a compression molding machine maintained at 140° C. The sheet was allowed to stand in a gear oven maintained at a temperature of 180° C. to decompose the organic blowing agent for conducting foaming. Thus, a foam was obtained. The gel fraction of the resulting expandable polyolefin resin composition, the gel fraction of the foam, the expansion ratio and state of cell structure of the foam are shown in the Table below.

The resulting foam had a gel fraction of 0% by weight and did not have a crosslinking structure. Further, the foam caused degassing during the foaming and had a low expansion ratio.

COMPARATIVE EXAMPLE 2

5 parts by weight of ADCA as an organic not generating an acidic substance and/or water during heat decomposition was compounded with 100 parts by weight of a mixture of 20% by weight of the silane-grafted polyethylene resin obtained in Synthesis Example 1 and 80% by weight of LDPE, and the blend was kneaded for 5 minutes using a mixing roll (8-inch test roll, manufactured by Kansai Roll Co., Ltd.) maintained at 130° C. to obtain a silane-crosslinking expandable polyolefin resin composition.

The thus-obtained silane-crosslinking expandable polyolefin resin composition was formed into a sheet having a thickness of 1 mm by a compression molding machine maintained at 140° C. The sheet was allowed to stand in a gear oven maintained at a temperature of 180° C. to decompose the organic blowing agent for conducting foaming. Thus, a crosslinked foam was obtained. The gel fraction of the resulting silane-crosslinking expandable polyolefin resin composition, the expansion ratio and state of cell structure of the foam are shown in the Table below.

The resulting crosslinked foam had a very low degree of crosslinking such that the gel fraction was 5% by weight. Further, the crosslinked foam caused degassing during the foaming and had a low expansion ratio.

COMPARATIVE EXAMPLE 3

10 parts by weight of OBSH as an organic blowing agent and 0.1 parts by weight of dibutyltin dilaurate as a catalyst were compounded with 100 parts by weight of the silane-grafted polyethylene resin obtained in Synthesis Example 1, and the blend was kneaded for 5 minutes using a mixing roll (8-inch test roll, manufactured by Kansai Roll Co., Ltd.) maintained at 130° C. to obtain a silane-crosslinking expandable polyolefin resin composition.

The thus-obtained silane-crosslinking expandable polyolefin resin composition was formed into a sheet having a thickness of 1 mm by a compression molding machine maintained at 140° C. The sheet was allowed to stand in a gear oven maintained at a temperature of 180° C. to decompose the organic blowing agent for conducting foaming. Thus, a crosslinked foam was obtained. The gel fraction of the resulting silane-crosslinking expandable polyolefin resin composition, the gel fraction of the foam, the expansion ratio and state of cell structure of the foam are shown in the Table below.

The resulting crosslinked foam had a very high degree of crosslinking such that the gel fraction was 95% by weight. Further, since the viscosity during the foaming was very high, the low expansion ratio was low.

TABLE

| | Addition amount of silane-grafted polyethylene resin (% by weight) | Blowing agent | Gel fraction before expansion (% by weight) | Gel fraction after expansion (% by weight) | Expansion ratio (times) | State of cells |
|---|---|---|---|---|---|---|
| Example 1 | 20 | OBSH | 0 | 18 | 10 | Both surface and central portion were uniform. |
| Example 2 | 20 | OBSH | 0 | 18 | 13 | Both surface and central portion were uniform. |
| Example 3 | 50 | OBSH | 0 | 47 | 12 | Both surface and central portion were uniform. |
| Example 4 | 50 | OBSH + ADCA | 0 | 25 | 16 | Both surface and central portion were uniform. |
| Example 5 | 20 | OBSH + ADCA | 0 | 18 | 25 | Both surface and central portion were uniform. |
| Comparative Example 1 | 0 | OBSH | 0 | 0 | 2 | Degassing occurred. |
| Comparative Example 2 | 20 | ADCA | 0 | 5 | 3 | Degassing occurred. |
| Comparative Example 3 | 100 | OBSH | 0 | 95 | 2 | Both surface and central portion were uniform. |

The silane-crosslinking expandable polyolefin resin composition according to the invention can provide a crosslinked foam having superior uniformity of cell structure in a foam and having superior heat resistance, can cut down the time necessary for the moisture crosslinking treatment, and can uniformly undergo crosslinking foam even for thick-wall products. Thus, the invention not only makes it possible to maintain a rich assortment of goods in stock, impart the shape and greatly improve the productivity but also can greatly cut down the production cost. Accordingly, the invention greatly contributes to the manufacture of a foam.

It should further be apparent to those skilled in the art that various changes in form and detail of the invention as shown and described above may be made. It is intended that such changes be included within the spirit and scope of the claims appended hereto.

This application is based on Japanese Patent Application No. 2002-116001 filed Apr. 18, 2002 and No. 2002-021793 filed Jan. 30, 2003, the disclosures of which are incorporated herein by reference in their entireties.

What is claimed is:

1. A process for obtaining a silane-crosslinked foam by heating and expansion molding a silane-crosslinking expandable polyolefin resin composition without carrying out a moisture crosslinking step, the silane-crosslinking expandable polyolefin resin composition comprising:

100 parts by weight of a mixture comprising
5–90% by weight of a silane-grafted polyethylene resin obtained by melt mixing i) 100 parts by weight of a linear low-density polyethylene having a molecular weight distribution (Mw/Mn), as determined in terms of a converted value of linear polyethylene using 1,2,4-trichlorobenzene as a solvent by a gel permeation chromatograph, of 5 or less and a density, as determined according to JIS K7676, of 0.87–0.945 g/cm$^3$, ii) 0.1–5 parts by weight of a vinyl-functional silane compound represented by the following formula:

$$RR'SiY_2$$

wherein R represents a monovalent olefinic unsaturated hydrocarbon group, Y represents a hydrolyzable organic group, and R' represents a monovalent hydrocarbon group other than aliphatic unsaturated hydrocarbons or is identical with Y, and iii) 0.01–0.5 parts by weight of a free radical generator, and 95–10% by weight of a polyolefin resin; and
2–20 parts by weight of a sulfonyl hydrazide compound as an organic blowing agent that generates an acidic substance and/or water as a decomposition product during heat decomposition, wherein foaming and crosslinking are performed simultaneously.

2. The process as claimed in claim 1, wherein the silane-crosslinking expandable polyolefin resin composition consists of:

100 parts by weight of a mixture comprising
5–90% by weight of a silane-grafted polyethylene resin obtained by melt mixing i) 100 parts by weight of a linear low-density polyethylene having a molecular weight distribution (Mw/Mn), as determined in terms of a converted value of linear polyethylene using 1,2,4-trichlorobenzene as a solvent by a gel permeation chromatograph, of 5 or less and a density, as determined according to JIS K7676, of 0.87–0.945 g/cm$^3$, ii) 0.1–5 parts by weight of a vinyl-functional silane compound represented by the following formula:

$$RR'SiY_2$$

wherein R represents a monovalent olefinic unsaturated hydrocarbon group, Y represents a hydrolyzable organic group, and R' represents a monovalent hydrocarbon group other than aliphatic unsaturated hydrocarbons or is identical with Y, and iii) 0.01–0.5 parts by weight of a free radical generator, and 95–100% by weight of a polyolefin resin; and
2–20 parts by weight of a sulfonyl hydrazide compound as an organic blowing agent that generates an acidic substance and/or water as a decomposition product during heat decomposition.

3. The process as claimed in claim 1, wherein the organic blowing agent is 4,4'-oxybis(benzenesulfonyl hydrazide) or a mixture of 4,4'-oxybis(benzenesulfonyl hydrazide) and azodicarbonamide.

4. The process as claimed in claim 1, wherein the silane-crosslinked foam has a gel fraction of 10% by weight or more.

* * * * *